United States Patent [19]

Poppinger et al.

[11] 3,778,691

[45] Dec. 11, 1973

[54] CONTROL CIRCUIT FOR AN ELECTRIC MACHINE HAVING AN ELECTRONIC COMMUTATOR

[75] Inventors: Herbert Poppinger, Erlangen-Sieglitzhof; Klaus Hüber, Erlangen, both of Germany

[73] Assignee: Siemens Aktiengesellschaft, Munich, Germany

[22] Filed: Aug. 17, 1972

[21] Appl. No.: 281,493

[30] Foreign Application Priority Data
Aug. 20, 1971 Germany.................. P 21 41 622.8

[52] U.S. Cl. .............................................. 318/254
[51] Int. Cl. .......................................... H02k 29/02
[58] Field of Search............................ 318/138, 254

[56] References Cited
UNITED STATES PATENTS

| | | | |
|---|---|---|---|
| 3,663,877 | 5/1972 | Clark | 318/138 |
| 3,696,277 | 10/1972 | Liska | 318/138 |
| 3,483,457 | 12/1969 | Fertig | 318/254 |
| 3,483,458 | 12/1969 | Kirk | 318/254 |
| 3,678,358 | 7/1972 | Kolatorowicz | 318/254 |

*Primary Examiner*—Bernard A. Gilheany
*Assistant Examiner*—Thomas Langer
*Attorney*—Hugh A. Chapin et al.

[57] ABSTRACT

A control circuit is disclosed for a converter fed electric machine in which thyristors, arranged in separate channels, are used as an electronic commutator. A rotor position transmitter in conjunction with three Hall effect generators produces pulsed signals mutually displaced 120 electrical degrees from each other. These signals, in combination with their inverse Hall signals, are used with logic circuitry to control the conduction period of the thyristors. The logic circuitry for each thyristor is composed of a first and second control circuit. The first control circuit comprising an addressing stage or NOR gate provides a pulse signal to control the conduction of the thyristor to insure maximum torque on starting. The second control circuit provides a thyristor control signal displaceable in time and the displacement of which is related to the desired displacement angle between the armature and the excitation field under the prevailing operating conditions. These two control signals are provided as input signals to a selective output circuit which controls the thyristor conduction period in response to the first occurring signal from either of the two control circuits.

9 Claims, 3 Drawing Figures

CONTROL CIRCUIT FOR AN ELECTRIC MACHINE HAVING AN ELECTRONIC COMMUTATOR

BACKGROUND OF THE INVENTION

1. Field of the Invention

This invention is concerned with a control circuit for an electric machine having an electronic commutator. More particularly it is concerned with a control circuit for an electric machine having an electronic commutator in which a d-c link and a rotor-position dependent transmitter, whose Hall signals and corresponding inverse Hall signals, are used to form control signals for the individual thyristors of the commutator.

It is an object of the invention to start a converter-fed motor with maximum torque, and, for speeds different from zero, to displace the angle between the armature and the excitation field, automatically and continuously, from $\psi = 90°$ to smaller angles, and to match the angle $\psi \neq 90°$ to the prevailing operating conditions, regardless of the type of converter, so that optimum power factor and efficiency occur over the entire speed range of the converter-fed motor.

2. Summary of the Invention

According to the invention, the problem is solved by controlling the individual thyristors by either an addressing circuit, dependent upon Hall signals, to generate fixed control pulses, or a distributor stage dependent on both simultaneously occurring Hall signals and on pulses, which are displaceable in time as a function of frequency and are common to each thyristor pair in a channel. Thus the first occurring output signal of either the addressing circuit or the distributor stage, determines the conduction state of the thyristor.

BRIEF DESCRIPTION OF THE DRAWINGS

Further details of the invention will be explained more fully with reference to an example of an embodiment schematically shown in the drawings, in which.

DESCRIPTION OF THE PREFERRED EMBODIMENT

Figure 1:
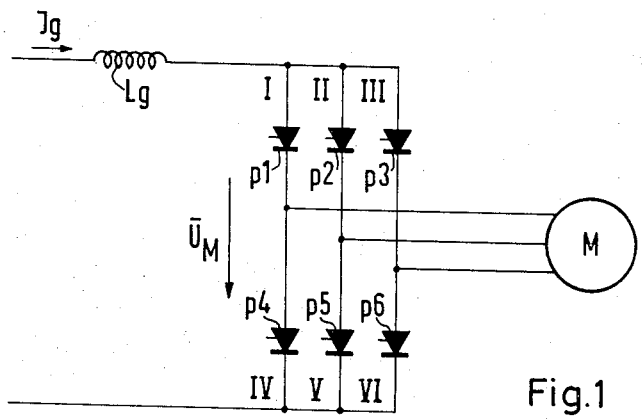
FIG. 1 illustrates a converter-fed three-phase motor with d-c link.

FIG. 1 shows a simplified presentation of a self-controlled converter-fed motor M having a d-c link $L_g$. The converter consists of six thyristors p1 to p6 in a bridge circuit, the firing signals of which are derived depending upon the rotor position, in the known manner, from a rotor position transmitter (not shown). The magnetic wheel of the transmitter, secured on the motor shaft, upon rotation, causes three Hall effect generators, mutually displaced by 120 electrical degrees and arranged in stationary relation at the motor housing, to transmit Hall signals H1, H2, H3.

Each of the Hall signals has a signal length of 180 electrical degrees and is electrically displaced relative to each other by 120°. The inverse or reciprocal Hall signals $\overline{H}1$, $\overline{H}2$, $\overline{H}3$ of corresponding nature as shown in FIG. 2 are also transmitted.

By linkig two Hall signals, six fixed control pulses U1 to U6 are obtained for the control of thyistors p1 to p6 of the converter. For example by appropriate circuitry a control pulse U1 can be produced by the simultaneous occurrence of a positive Hall signal H1 and a positive inverse Hall signal $\overline{H}3$. Further through appropriate correlation of the fixed control pulses with the individual thyristors, the angle between the armature field and the excitation field can be adjusted to $\psi = 90°$ for the starting of the motor M and the development of its maximum torque. In operation, however, the motor can not be run with $\psi = 90°$, particularly with commutation by the machine voltage. This means that in order for the drive to operate at all, in each case the fixed control pulses must be determined and advanced against the direction of rotation by a displacement angle to be determined in each case.

The angle $\psi$ is chosen in machine-commutated converter-fed motors in such a manner that they operate capacitatively in order to make the required reactive commutation power available. On the other hand, in converter-fed motors, with forced commutation, the angle $\psi$ is to be matched to the operating conditions in such a manner that they operate with optimum power factor.

Figure 2:
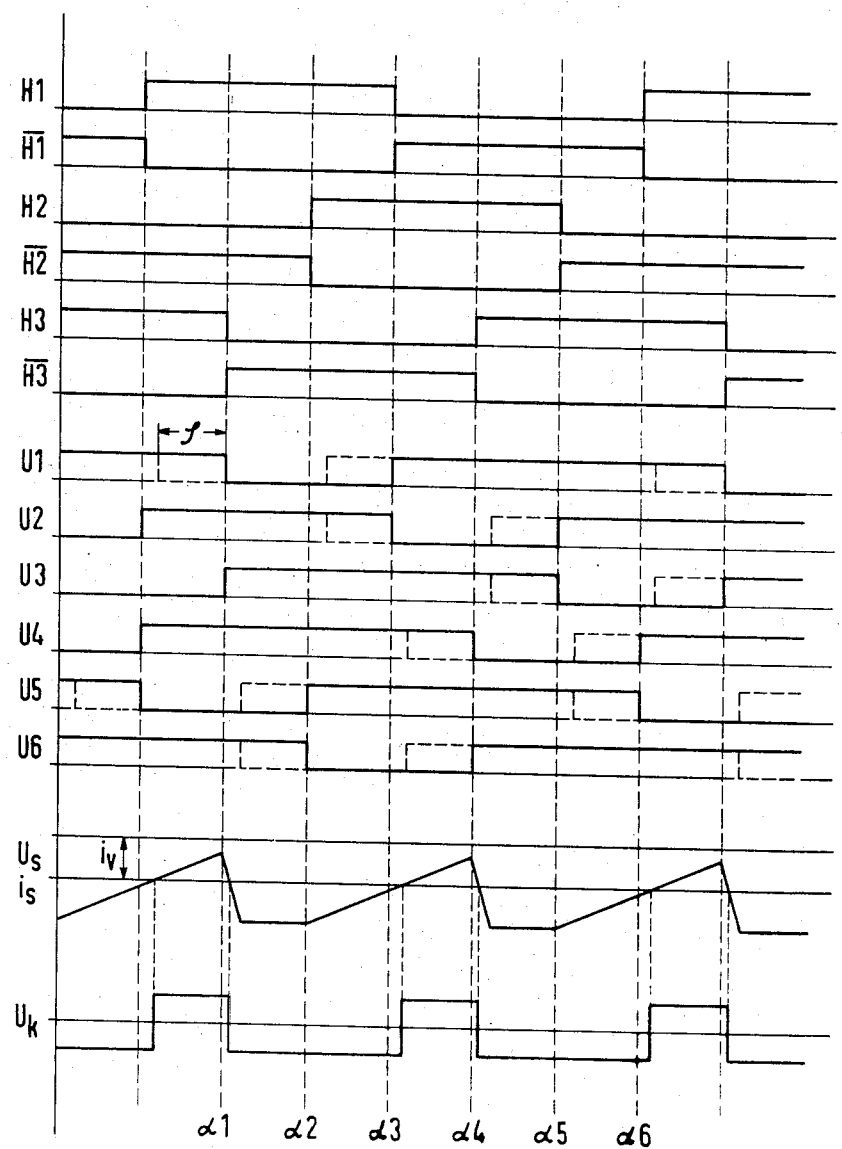
FIG. 2 illustrates the time relationship of all control signals.

For shifting the fixed control pulses U1 to U6 according to FIG. 2, a sawtooth signal $i_s$ is generated which is synchronized by the fixed Hall signals H2, H3, $\overline{H}2$, $\overline{H}3$ and linearly changes with time. This sawtooth signal is compared with a comparison signal $i_v$, proportional to the displacement angle, to permit the continuous changing of the displacement angle $\phi$ between its limits. In order to make the displacement angle $\phi$ independent of both the speed of rotation and the frequency of the converter-fed motor, when the comparison signal is maintained constant, the slope of the sawtooth signal is therefore controlled as a function of frequency.

Figure 3:
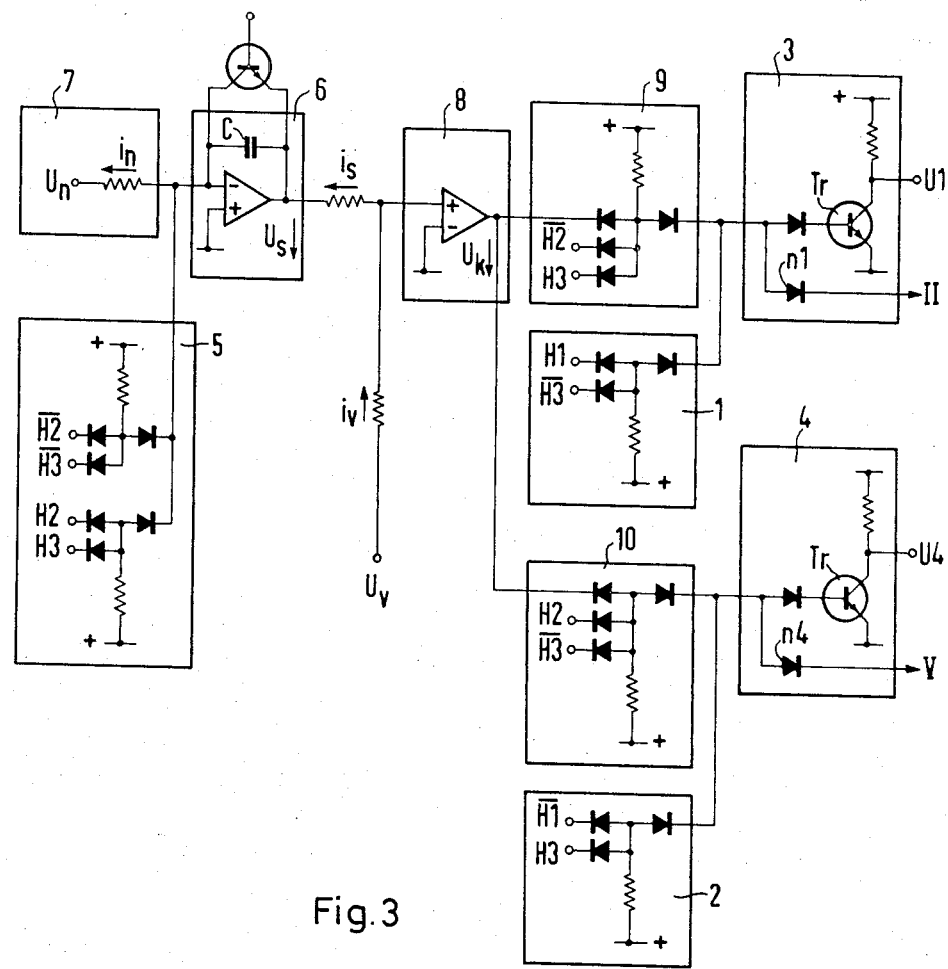
FIG. 3 illustrates a control circuit according to the invention for two series-connected channels of the stator.

FIG. 3 shows, in a simplified manner, part of the circuit for generating the fixed control pulses and the pulses displaced by the displacement angle $\phi$ shown by dashed lines for the cooperatig thyristors p1 and p4 of two channels I and IV, displaced by 180 electrical degrees. A similar situation also applies to the other channels for controlling the other thyristor pairs p2, p5 and p3, p6, respectively.

At standstill, when no displaced pulses are yet generated, the fixed control pulses are formed by so-called addressing circuits 1, 2 (NOR gates) and fed to the input of the output stage 3 or 4, respectively. In the example shown the output stage 3 of channel I conducts and drives the associated thyristor p1 through a matching stage, not shown, only when the Hall signals H1 and $\overline{H}3$, fed to the addressing circuit 1, are both simultaneously positive. This condition exists during the time interval $\alpha 1$ to $\alpha 3$ (FIG. 2). The thyristor associated with channel IV, p4, conducts through the corresponding, separate addressing circuit 2 for simultaneous positive Hall signal $\overline{H}1$ and H3 during the time interval $\alpha$ 4 to $\alpha$ 6.

For displacing the fixed control pulses at a speed of the motor M different from zero, a sawtooth signal is generated in the following manner:

The output voltage $U_s$ (FIG. 2) of an integrator 6 is used as the sawtooth generator through a synchronizing stage 5 connected to one input of integrator 6. Synchronizing stage 5 consists of two NOR gates influenced respectively by the Hall signals H2, H3 and the inverse Hall signals $\overline{H}2$, $\overline{H}3$. The integral will always have its highest negative value if in the intervals $\alpha$ 1 to α2 and α4 to α5, (FIG. 2) either the inverse Hall signals H̄2 and H̄3 or the Hall signals H2 and H3 are simultaneously positive.

During the remainder of the period the integration capacitor C of integrator 6, having a switchable parallel path associated with it for the purpose of limiting the voltage, is linearly discharged by a speed- or frequency-proportional current $i_n$ generated in a current source 7 connected with the input of the integrator 6. The output voltage $U_s$ changes in the positive direction, until at the time α1 or α4, during the synchronization time, the above-mentioned recharging of the capacitor C begins. The output voltage $U_s$ produces a current $i_s$ which is compared at the input of the flipflop 8, with reference (comparison) current $i_v$ which is proportional to the displacement angle $\phi$. The output of flipflop 8 is connected to both distributor stages 9 and 10. The output voltage $U_K$ of the flipflop 8, fed to the distributor stages 9, 10, is negative for $i_s \geq i_v$ and jumps to its positive maximum value at $i_s \leq i_v$ (FIG. 2). Displaced pulses with twice the firing frequency of the thyristor are therefore fed to the distributor stages 9 and 10 of the two channels I and IV, which operate with a mutual displacement of 180 electrical degrees.

The distributor stage 9 is further influenced by the Hall signals H̄2 and H3, and the distributor stage 10 by their inverse Hall signals H2 and H̄3. Thus, the output of the distributor stage 9, is fed to the output stage 3, for instance, can become positive only if a displaced pulse is to be generated, and only when the output voltage $U_k$ of the flipflop 8 and the Hall signals H̄2 and H3 are all simultaneously positive. In that case, the thyristor p1 of channel I is driven into conduction, although no signal is then present through the addressing circuit 1. Therefore, the time of firing thyristor p1 is determined by the earlier existing positive signal of either the addressing circuit 1 or the distributor stage 9. A similar situation is true regarding the thyristor p4 of channel IV with respect to the signals of addressing circuit 2 and the distributor stage 10. In this manner, a continuous transition from fixed control pulses to displaced pulses (dashed in FIG. 2) is obtained without any separate switching means whatsoever.

In the six-pulse converter circuit shown in FIG. 1, another two pulse generator stage of the kind shown in FIG. 3 must be provided for channels II and V as well as III and VI for the thyristors p2, p5 and p3, p6, respectively. In order to assure a pulse duration of 120 electrical degrees for the displaced pulses, the three respective output stages 3 and 4 of one half of the bridge are interlocked with thyristors p1, p2, p3 and p4, p5, p6. For this the cathode of one diode n1 or n4, of the output stages 3 and 4 of channel I and IV is connected with the input, e.g., the collector of a transistor of a subsequently conducting output stage of channel II AND V (not shown) so that the corresponding transistor Tr of the output stage 3 and 4 of channel I and IV is cut off when the output stage of channel II or IV, is controlled into conduction, and the pulse for the associated thyristor, p1 or p4, is thereby terminated. In a similar manner the output stages of the other channels are also interlinked.

Because the displaced pulses for the thyristors which are operative for 180 electrical degrees, for instance, p1 and p4, are derived from the same sawtooth signal, they have exactly the same pulse length, so that the motor winding does not carry an undesired d-c component.

The slope of the sawtooth signal $U_s$ is obtained from the relation $$U_2/\Delta t = i_n/C \; N \; i_s/\Delta t \; N \; n/C, \text{ as } i_n \text{ is proportional to } n.$$

However, as $\Delta i_s/\Delta t = i_v/(\phi/\omega)N \; n/C$, one has $\phi N \; i_v \cdot (\omega C/n)$, and hence $\phi N \; i_v$ because $n$ is proportional to $\omega$.

The relation between the comparison current $i_v$ and the displacement angle $\phi$ is linear and independent of frequency. This also applies analogously to the displacement voltage $U_v$, which depends on the type of the converter commutation. The displacement voltage $U_v$ is changed, for instance, as a function of the load current Jg (FIG. 1) in the case of machine commutation with constant machine excitation, or as a function of the speed in the case of forced commutation with constant machine excitation (matching of the constant reversal frequency of the commutation circuits to the variable machine frequency).

If the displacement angle $\phi$ is increased beyond 90°, the motor voltage $\bar{U}_M$ (FIG. 1) is reversed while the direction of the load current Jg remains the same, so that the machine is now braked as a generator (two-quadrant operation), without the need for a separate reversing converter.

In the case where four-quadrant operation is required of the machine, two Hall signal pairs are interchanged by a separate, external switch (not shown), for example, H1 with H2, H̄1 with H̄2, because of the sequence of the channels I, II, III and IV, V, VI due to the interlock at standstill, so that the control can work correspondingly in the other direction of rotation.

What is claimed is:

1. A control circuit for an electric machine having a direct current link to an electronic commutator, the electronic commutator comprised of a plurality of control thyristors connected in a plurality of channels, each channel having at least two thyristors, said machine further having a rotor position transmitter for generating a plurality of positive and inverse Hall voltage signals, the positive Hall signals comprising voltage pulses having a periodicity of 180 electrical degrees and a mutual displacement from each other of 120 electrical degrees, the control circuit comprising:

means to generate a pulse signal having a phase angle related to a predetermined displacement angle between armature and excitation field of the machine, a first control circuit means for producing a first thyristor control output signal, the input to said circuit means comprising two predetermined positive and inverse Hall voltage signals, mutually displaced from each other by 60 electrical degrees, said circuit means producing a control signal for starting the motor, the control output signal occurring only during the period when the two Hall input signals are positive, a second control circuit means for producing a second thyristor control output signal, said circuit means having an input comprising two other predetermined positive and inverse Hall voltage signals, mutually displaced from each other by 60 electrical degrees, and said pulse signal said second control circuit means producing a control output signal only during the period when all three inputs are positive, and an output circuit means connected to a thyristor in said commutator, said output stage having two inputs, one from said first control circuit means and the other from said second control circuit means, said output means controlling the conduction of said thyristor in response to the first occurring signal from either of said control means so that the thyristor conducts to maintain a predetermined displacement angle between the armature and the excitation field of the machine.

2. A control circuit for an electric machine as in claim 1 wherein said electronic commutator comprises six thyristors connected in three channels and wherein each thyristor has a control circuit to maintain the predetermined displacement angle between the armature and the excitation field of the machine.

3. A control circuit for an electric machine, having a direct current link to an electronic commutator, the electronic commutator comprised of a plurality of control thyristors coupled to armature windings in the machine, said machine further having means for generating a plurality of Hall signals at least equal to the number of armature windings in the machine and indicative of the rotor position with respect to the windings and means for generating the inverse of said Hall signals, comprising for each of the control thyristors:

a first control circuit means responsive to at least one of said Hall signals and inverse Hall signals to produce a first output signal which is in a fixed phase relationship to the rotor;

means to generate a pulse signal representing a predetermined phase angle between the armature and excitation field of the motor;

a second control circuit means responsive to at least another of said Hall signals and said inverse Hall signals and further responsive to said pulse signal representing said predetermined phase angle, said second control circuit means providing a second output signal only when both said at least another of said Hall signals and inverse Hall signals and said pulse signal are present; and an output circuit means having said first and second output signals as inputs and providing an output to turn on its associated thyristor when either of said output signals is present.

4. A control circuit for an electric machine as in claim 3 in which the predetermined displacement angle pulse signal is produced as an output of a flipflop circuit whose input signal is the sum of a signal proportional to the displacement angle and a controlled frequency sawtooth signal.

5. A control circuit for an electric machine as in claim 4 in which the controlled frequency sawtooth signal is produced as an output of an integrator whose first input is a positive directly coupled output signal from a synchonrization stage, having two NOR gates, the inputs to the first of which are two predetermined Hall voltage signals and the inputs to the other of which are the inverse of the first two predetermined Hall voltage signals, and whose second input is a resistively coupled negative signal proportional to the speed of the electric machine.

6. A control circuit for an electric machine as in claim 5 in which the second input to the integrator is a signal proportional to the frequency of the machine.

7. A control circuit for an electric machine as in claim 4 further comprising an interlocking circuit between each output stage of the respective conducting thyristor and the previously conducting thyristor so that the output of each output stage of a thyristor control circuit is connected to the input of the output stage of the thyristor previously controlled into conduction.

8. A control circuit for an electric machine as in claim 7 in which the interlocking circuit is comprised of a diode.

9. A control circuit for an electric machine as in claim 3 in which the first control circuit means comprises a first NOR gate, the second control circuit comprises a second NOR gate, and the output stage is comprised of a diode controlled transistor stage having an output only upon the conduction of the diode.

* * * * *

UNITED STATES PATENT OFFICE
CERTIFICATE OF CORRECTION

Patent No. 3,778,691      Dated December 11, 1973

Inventor(s) Herbert Poppinger and Klaus Hübner

It is certified that error appears in the above-identified patent and that said Letters Patent are hereby corrected as shown below:

In column 1, line 66, change "linkig" to --linking--

In column 3, line 28, change "stage 9 is fed to" to --stage 9, fed to--

In column 3, line 57, change "channel II AND V" to --channel II and V--

In column 4, line 6, change "$U_2/\Delta t = i_n/C \ N \ i_s/\Delta t \ N \ n/C$" to --$U_s/\Delta t = i_n/C \sim i_s/\Delta t \sim n/C$--

In column 4, line 7, change "$\Delta i_s/\Delta t = i/(\phi/\omega) \ N \ n/C$, one has $\phi \ N \ i_v \cdot (\omega C/n)$, and hence $\phi \ N^v i_v$ because..." to: --$\Delta i_s/\Delta t = i_v/(\phi/\omega) \sim n/C$, one has $\phi \sim i_v \cdot (\omega C/n)$, and hence $\phi \sim i_v$ because...--

In column 6, line 6 (claim 4) change "in clai 3" to --in claim 3--

Signed and sealed this 24th day of December 1974.

(SEAL)
Attest:

McCOY M. GIBSON JR.
Attesting Officer

C. MARSHALL DANN
Commissioner of Patents